United States Patent
Needham et al.

(10) Patent No.: US 6,490,322 B2
(45) Date of Patent: *Dec. 3, 2002

(54) DIGITAL OPAQUE PROJECTOR FOR EASY CREATION AND CAPTURE OF PRESENTATION MATERIAL

(75) Inventors: Bradford H. Needham, Hillsboro, OR (US); Daniel A. Teibel, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,179

(22) Filed: Jul. 28, 1998

(65) Prior Publication Data

US 2002/0113903 A1 Aug. 22, 2002

(51) Int. Cl.[7] .................................................. H04B 1/60
(52) U.S. Cl. .................. 375/240.16; 348/699; 382/236
(58) Field of Search ....................... 375/240.16, 240.01, 375/240.12, 240.21, 240.24, 240.15; 382/103, 107, 232, 236, 238, 239, 245; 345/145–146; 348/569, 511, 601, 568, 567, 556, 441, 445, 446, 452, 555, 425.3, 407.1, 416.1, 431.1, 143, 699, 700

(56) References Cited

U.S. PATENT DOCUMENTS

| | | | | |
|---|---|---|---|---|
| 4,876,597 A | * | 10/1989 | Roy et al. ................... | 348/143 |
| 5,418,548 A | * | 5/1995 | Fukushi ..................... | 345/145 |
| 5,635,985 A | * | 6/1997 | Boyce et al. .......... | 375/240.15 |
| 5,673,087 A | * | 9/1997 | Choi et al. .................. | 348/511 |
| 5,835,147 A | * | 11/1998 | Florentin et al. ...... | 375/240.12 |
| 5,838,823 A | * | 11/1998 | Ancessi ..................... | 382/232 |
| 5,946,417 A | * | 8/1999 | Bonneau et al. ............ | 348/236 |
| 6,124,893 A | * | 9/2000 | Stapleton ................... | 348/441 |

\* cited by examiner

*Primary Examiner*—Chris Kelley
*Assistant Examiner*—Gims Philippe
(74) *Attorney, Agent, or Firm*—Blakely, Sokoloff, Taylor & Zafman LLP (57) ABSTRACT

A method for managing a frame of data includes capturing the frame of data from an image at a location. It is determined whether the image is a new image. The frame of data is displayed if the image is the new image.

18 Claims, 7 Drawing Sheets

DIGITAL OPAQUE PROJECTOR FOR EASY CREATION AND CAPTURE OF PRESENTATION MATERIAL

FIELD OF THE INVENTION

The present invention relates to the field of computer systems. More specifically, the present invention relates to the use of computer systems to facilitate document sharing for presentations and recording.

BACKGROUND OF THE INVENTION

The growth in personal computer (PC) usage and internet connectivity has forged new and creative ways for individuals and businesses to communicate. Among these new methods include those which involve using video cameras to add video input to communication. Video cameras allow individuals and businesses to participate in activities such as video conferencing and document sharing.

In the past, document sharing among parties at remote locations involved the use of a document camera. The document camera captured images in its field of view. The images captured were transmitted as real-time video from the camera to viewers at remote locations. This approach was effective in presenting images to viewers at remote locations, however, it required a high bandwidth connection which was costly and not always available.

Other approaches taken to facilitate document sharing included using a device that captured a snap shot of an image in the field of view of the document camera and transmitted only the snap shot to viewers. This device was effective in conserving the amount of bandwidth required for data transmission. However, because only snap shots (frames of data) of an image were transmitted, the device was not effective in capturing the usage of a pointing mechanism used to point to locations in the image during a presentation or recording. This device also required its user to manually indicate when a next snap shot is to be taken and transmitted which often proved to be troublesome.

SUMMARY OF THE INVENTION

A method for managing data is disclosed. Data is captured from an image at a location. Whether the image is a new image is determined. The data is distributed if the image is the new image.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
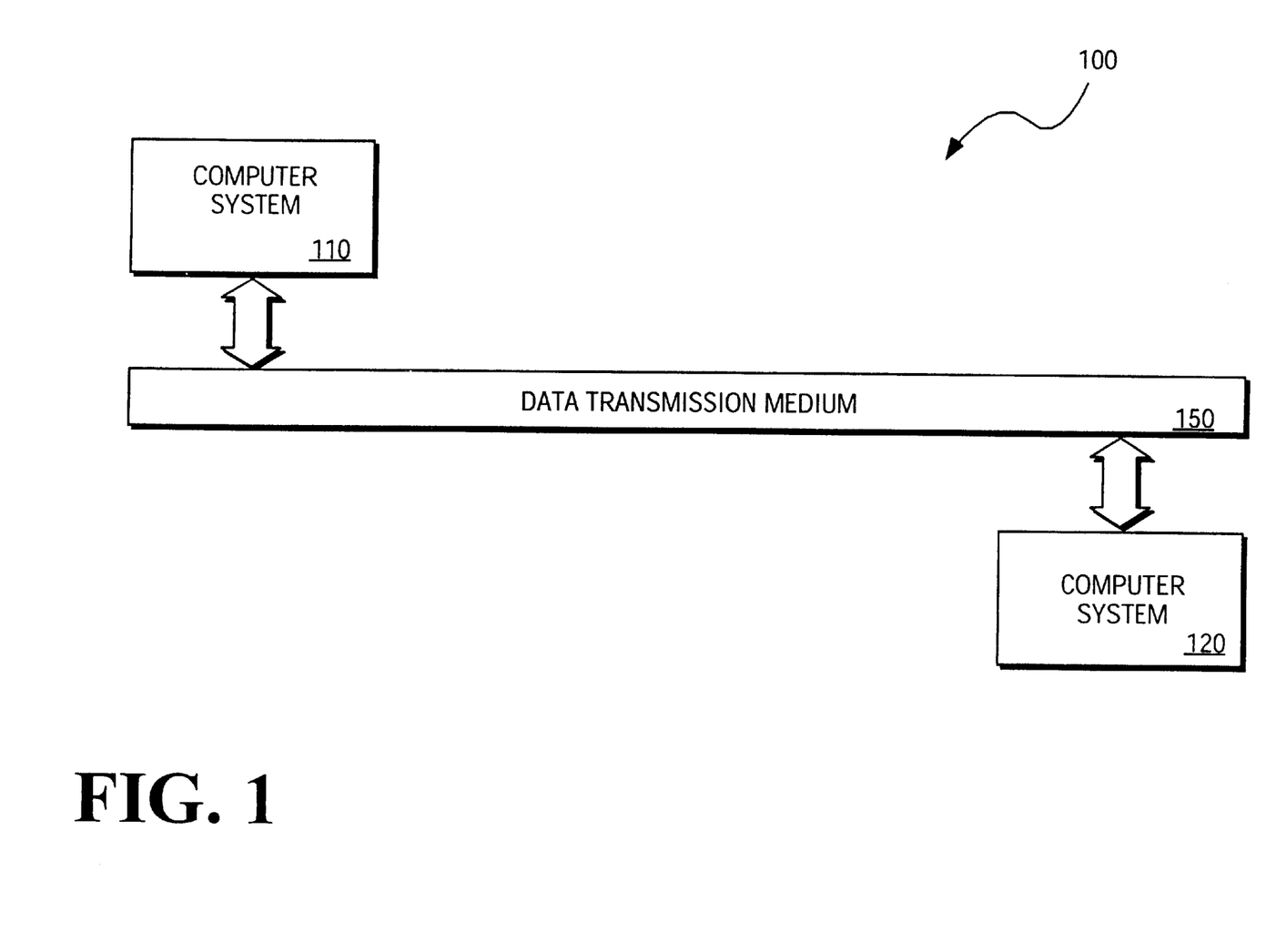
FIG. 1 is a block diagram of a network of computer systems implementing an embodiment of the present invention.

FIG. 1 is a block diagram of a network 100 implementing an embodiment of the present invention. The network includes a first computer system 110 at a first location and a second computer system 120 at a second location. The first computer system 110 and the second computer system 120 are coupled to a transmission medium 150. The first computer system 110 and the second computer system transmit data to each other via the data transmission medium 150. The transmission medium 150 may be one or a combination of fiber optics, cable, twisted pair, microwave, or other media. The transmission medium 150 may be implemented to support an internal network connection, an internet connection, or other connections.

According to an embodiment of the present invention, the first computer system 110 is used to facilitate document sharing and recording. The first computer system 110 allows a user to share and record documents without requiring the documents to be in computer readable format. The first computer system 110 allows the user to use a document camera (not shown) like an overhead projector. Foils may be placed in the field of view of the document camera and a pointing mechanism may be used by the user to point to sections in the document. The first computer system 110 detects when the foil is changed and tracks the position of the pointing mechanism as directed by the user.

A distributive program (not shown) in the first computer 110 system may be used to transmit information regarding the documents to the second computer system 120. The information may be transmitted via the transmission medium 150 (shown in FIG. 1) using a transfer control protocol/internet protocol (TCP/IP), user datagram protocol (UDP), or other protocol. The distributive program may transmit a uniform resource locator (URL) of where an image of a new foil may be found and a position of the pointing mechanism to the second computer system 120. Alternatively, the distributive program may transmit a frame of data that includes an image of a new foil or a position of the pointing mechanism to the second computer system 120. The second computer system 120 obtains the frame of data, displays the image of the new foil, and generates a pointer on the image with the position information. By transmitting only snap shots or locations of snap shots of new images and pointing mechanism positions, the computer system 110 facilitates document sharing without requiring a high bandwidth connection.

Figure 2:
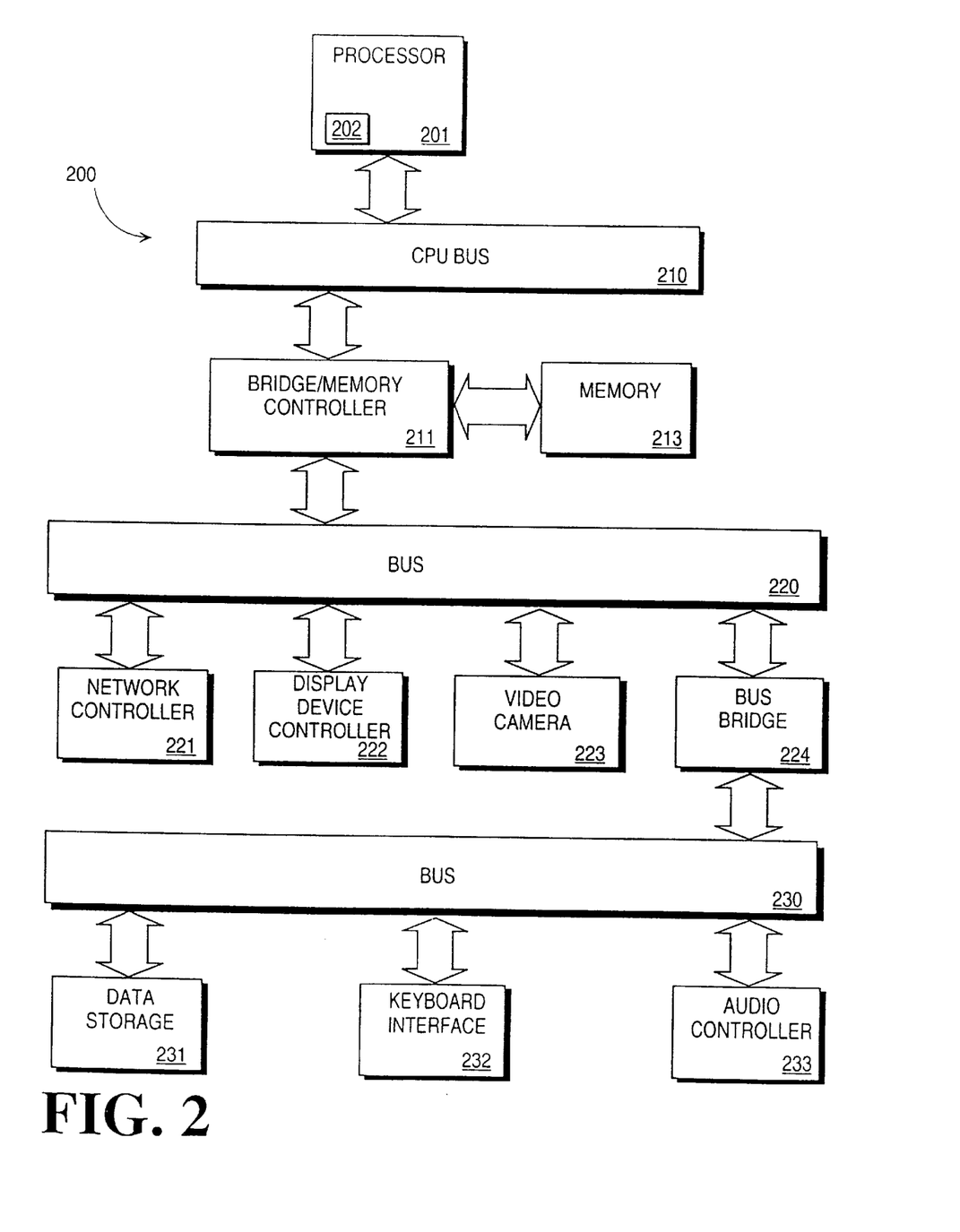
FIG. 2 is a block diagram of a computer system implementing an embodiment of the present invention.

FIG. 2 is a block diagram of a computer system 200 upon which an embodiment of the present invention can be implemented. The computer system 200 may be implemented as the first computer system 110 or the second computer system 120 shown in FIG. 1. The computer system 200 includes a processor 201 that processes data signals. The processor 201 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210 that transmits data signals between processor 201 and other components in the computer system 200.

The computer system 200 includes a memory 213. The memory 213 may be a dynamic random access memory (DRAM) device, a static random access memory (SRAM) device, or other memory device. The memory 213 may store instructions and code represented by data signals that may be executed by the processor 201. A cache memory 202 resides inside processor 201 that stores data signals stored in memory 213. The cache 202 speeds up memory accesses by the processor 201 by taking advantage of its locality of access. In an alternate embodiment of the computer system 200, the cache 202 resides external to the processor 201.

A bridge memory controller 211 is coupled to the CPU bus 210 and the memory 213. The bridge memory controller 211 directs data signals between the processor 201, the memory 213, and other components in the computer system 200 and bridges the-data signals between the CPU bus 210, the memory 213, and a first I/O bus 220.

The first I/O bus 220 may be a single bus or a combination of multiple buses. As an example, the first I/O bus 220 may comprise a Peripheral Component Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers (not shown in FIG. 2) and supports communication among the machines. A display device controller 222 is coupled to the first. I/O bus 220. The display device controller 222 allows coupling of a display device to the computer system 200 and acts as an interface between the display device and the computer system 200. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200. A video. camera 223 is coupled to the first I/O bus 220. The video camera 223 may be a document camera. The video camera 223 operates to capture an image of an object. The video camera 223 may be a digital video camera having internal digital video capture hardware that translates the captured image into digital graphical data. The video camera 223 may be an analog video camera having digital video capture hardware external to the video camera 223 for digitizing the captured image.

A second I/O bus 230 may be a single bus or a combination of multiple buses. As an example, the second I/O bus 230 may comprise a PCI bus, a PCMCIA bus, a NuBus, an Industry Standard Architecture (ISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, a flash memory device or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. An audio controller 233 is coupled to the second I/O bus 230. The audio controller 233 operates to coordinate the recording and playing of sounds.

A bus bridge 224 couples the first I/O bus 220 to the second I/O bus 230. The bus bridge 224 operates to buffer and bridge data signals between the first I/O bus 220 and the second I/O bus 230.

The present invention is related to the use of the computer system 200 to manage frames of data. According to one embodiment, managing frames of data is performed by the computer system 200 in response to the processor 201 executing sequences of instructions in main memory 213. Such instructions may be read into memory 213 from another computer-readable medium, such as data storage device 231, or from another source via the network controller 221. Execution of the sequences of instructions causes the processor 201 to manage frames of data, as will be described hereafter. In an alternative embodiment, hardware circuitry may be used in place of or in combination with software instructions to implement the present invention. Thus, the present invention is not limited to any specific combination of hardware circuitry and software.

Figure 3:
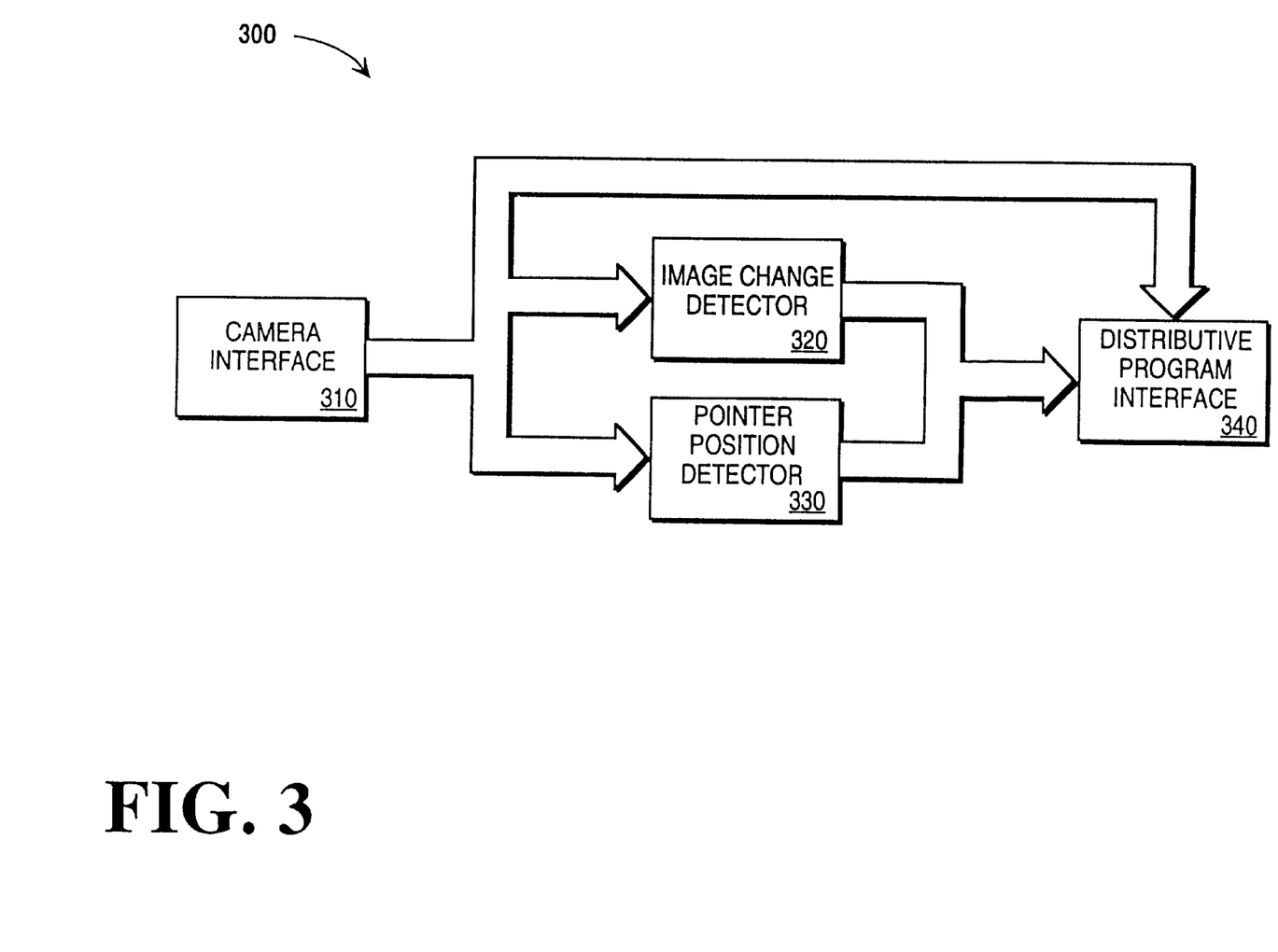
FIG. 3 is a block diagram of a digital opaque projector according to an embodiment of the present invention.

FIG. 3 is a block diagram illustrating modules implementing a digital opaque projector 300 that manages frames of data according to an embodiment of the present invention. In a preferred embodiment of the present invention, the modules are implemented by software and reside in main memory 213 (shown in FIG. 2) of the first computer system 110 (shown in FIG. 1) as sequences of instructions. It should be appreciated that the modules may also be implemented by hardware as components coupled to the bus 220 (shown in FIG. 2) or a combination of both hardware and software.

Block 310 represents a camera interface. The camera interface 310 communicates with the video camera 223 (shown in FIG. 2). The camera interface 310 may be used to program a frame rate in which the video camera 223 captures data. The camera interface 310 receives a frame of data which includes an image captured within a field of view of the video camera 223. The image may include objects such as a foil and a pointing mechanism.

Block 320 represents an image change detector. The image change detector 320 is coupled to the camera interface. The image change detector 320 receives frames of data from the camera interface 310 and determines whether an image captured by the video camera 223 is a new image. The image change detector 320 makes this determination by first determining whether there is motion occurring in the field of view of the video camera 223. If motion is detected, the foil change detector 320 waits a predetermined period of time after the motion has stopped. The foil change detector 320 then compares a new frame of data received by the camera interface after the motion has stopped with a previous frame of data corresponding to a previous image that was displayed to determine if the new frame of data corresponds to a new image. By comparing the new frame with the previous frame, the image change detector 320 takes into account gesturing or the use of a pointing mechanism within the field of view of the video camera 223 when determining whether a new image is captured by the video camera 223. According to an embodiment of the present invention, the image change detector 320 determines whether an image of a foil captured by the video camera 223 is a new image.

Block 330 represents a pointer position detector. The pointer position detector 330 is coupled to the camera interface 310. The pointer position detector 330 receives frames of data from the camera interface 310 and determines whether a frame of data includes an image of a pointing mechanism. If the frame of data includes an image of the pointing mechanism, the pointer position detector 330 locates a position of the pointing mechanism. The pointer position detector 330 may determine a position of a pointing mechanism by searching a frame of data for an object with a same color, shape, or color and shape as the pointing mechanism.

Block 340 represents a distributive program interface. The distributive program interface 340 is coupled to the camera interface 310, the image change detector 320, and the pointer position detector 330. The distributive program interface 340 receives the frames of data from the camera interface 310, information regarding whether a frame of data includes a new image from the image change detector 320, and whether the frame of data includes an image of a pointing mechanism and a location of the pointing mechanism from the pointer position detector 320. The distributive program interface 340 interfaces with a distributive program (not shown) that distributes data to the second computer system 120 (shown in FIG. 1). According to an embodiment of the present invention, the distributive program interface 340 stores the frame of data of every new image received from the camera interface 310 as a file in a location in the data storage device 231 (shown in FIG. 2). The distributive program interface 340 transmits an URL that corresponds to the file to the distributive program to distribute to the second computer system 120. The distributive program interface 340 also transmits a position of any pointer mechanism in a frame of data to the distributive program to distribute to the second computer system 120. According to an alternative embodiment of the present invention, the distributive program interface 340 transmits the position of any pointer mechanism in the field of view in any image received from the camera interface 310, and transmits every new image received from the camera interface 310.

According to an embodiment of the present invention, the computer system 110 is used to facilitate document recording instead of document sharing. In this embodiment, the distributive program interface 340 may record onto a storage medium the positions of the pointer mechanism found in the images along with the URLs that correspond to files containing the new images. The distributive program interface 340 may record a time marker with each recorded URL and pointing mechanism position to indicate when the new image and pointer should be generated and displayed.

The camera interface 310, the image change detector 320, the pointer position detector 330, and the distributive program interface 340 may be implemented by any known circuitry or technique. In an embodiment of the present invention where the digital opaque projector 300. is implemented in hardware, the camera interface 310, the image change detector 320, the pointer position detector 330, and the distributive program interface 340 all reside on a single semiconductor substrate.

Figure 4:
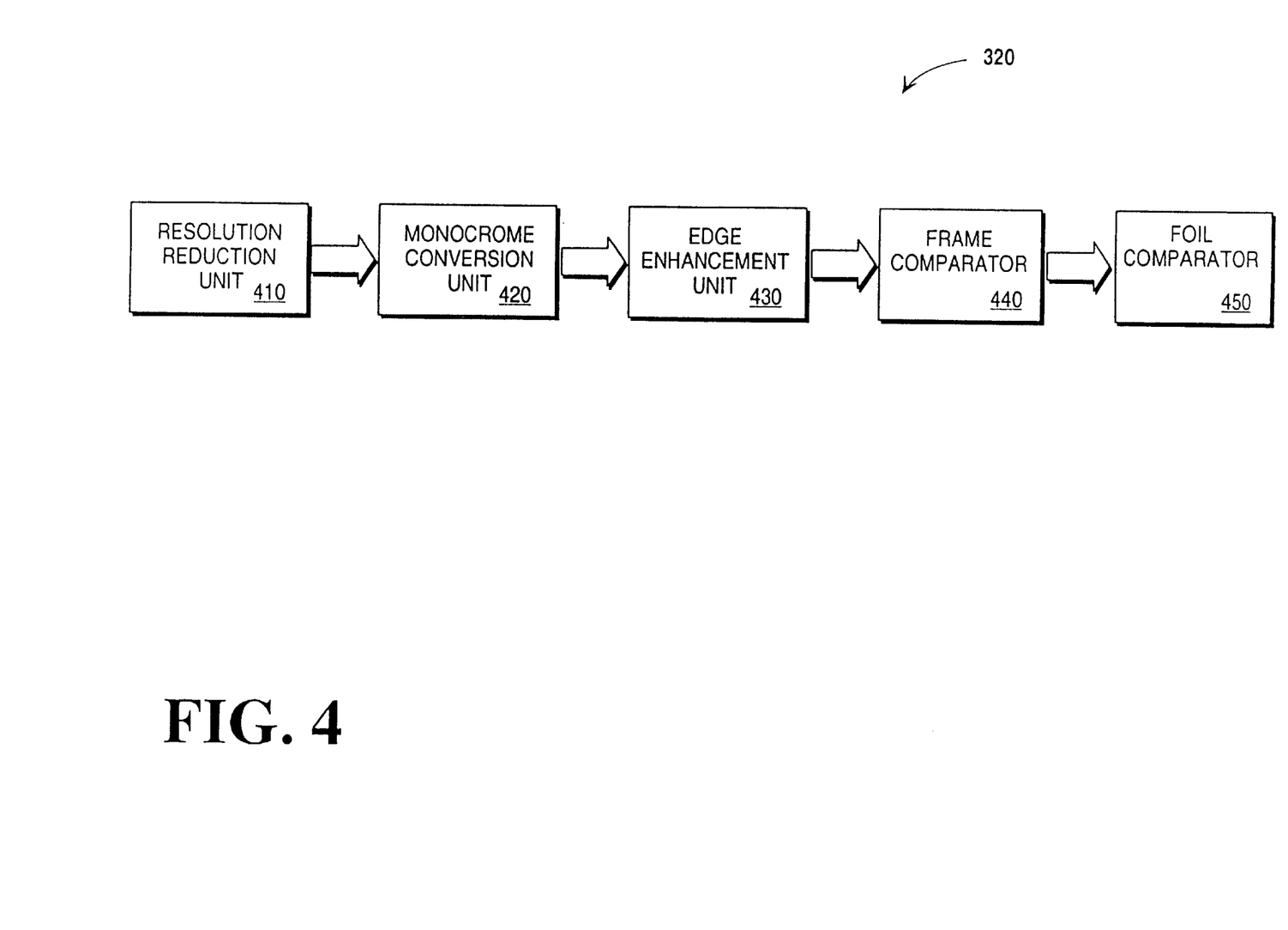
FIG. 4 is a block diagram of a image change detector according to an embodiment of the present invention.

FIG. 4 is a block diagram of an image change detector 320 according to an embodiment of the present invention. The image change detector 320 includes a resolution reduction unit 410. The resolution reduction unit 410 receives frames of data from the camera interface 310 (shown in FIG. 3). The resolution reduction unit 410 reduces the resolution of the frames of data. According to an embodiment of the present invention, the resolution reduction unit 410 reduces the resolution of the frames of data by sub-sampling. It should be appreciated that the resolution reduction unit 410 may reduce the resolution of the frames of data-using other techniques such as aliasing, or filtering. Reducing the resolution of the frames of data condenses the data and allows it to be processed by the image change detector 320 at a faster rate.

A monochrome conversion unit 420 is coupled to the resolution reduction unit 410. The monochrome conversion unit 420 receives the frames of data from the resolution reduction unit 410 and converts the frames of data from a red green blue (RGB) color mapping scheme to a monochrome mapping scheme. Converting the frames of data to a monochrome representation reduces the frame to brightness-only information.

An edge enhancement unit 430 is coupled to the monochrome conversion unit 420. The edge enhancement unit 430 receives the frames of data from the monochrome conversion unit 420 and performs edge enhancement on the frames of data. According to an embodiment of the present invention, edge enhancement of a pixel includes calculating an average value of surrounding pixels of selected pixel and subtracting the average value from the selected pixel. Edge enhancement has the effect of removing shadows from an image and producing an image with sharp edges.

A frame comparator 440 is coupled to the edge enhancement unit 430. The frame comparator receives the frames of data from the edge enhancement unit 420 and compares a frame of data captured at a time t with a frame of data captured at time t−1. A difference is performed between the two frames. If the difference value is greater than a predetermined value, the frame comparator 440 determines that the image in the frames is moving.

A foil comparator 450 is coupled to the frame comparator 440. The foil comparator 450 receives the frames of data from the frame comparator 440 along with an indication for each frame of whether motion was detected in that frame. Whenever the foil comparator 450 receives n sequential frames that contain no motion, the foil comparator 450 compares the final frame in that sequence, with a previous frame of data that was indicated as having a new image, to determine whether the final frame in the sequence corresponds to a new image.

It should be appreciated that the image change detector 320 may be implemented without the resolution reduction unit 410, monochrome conversion unit 420, and the edge enhancement unit 430. The resolution adjustment unit 410, monochrome conversion unit 420, edge enhancement unit 430, frame comparator 440, and foil comparator 450 may be implemented using any known circuitry or technique. In an embodiment of the present invention where the image change detector 320 is implemented in hardware, the resolution reduction unit 410, monochrome conversion unit 420, edge enhancement unit 430, frame comparator 440, and foil comparator 450 all reside on a same silicon substrate.

Figure 5:
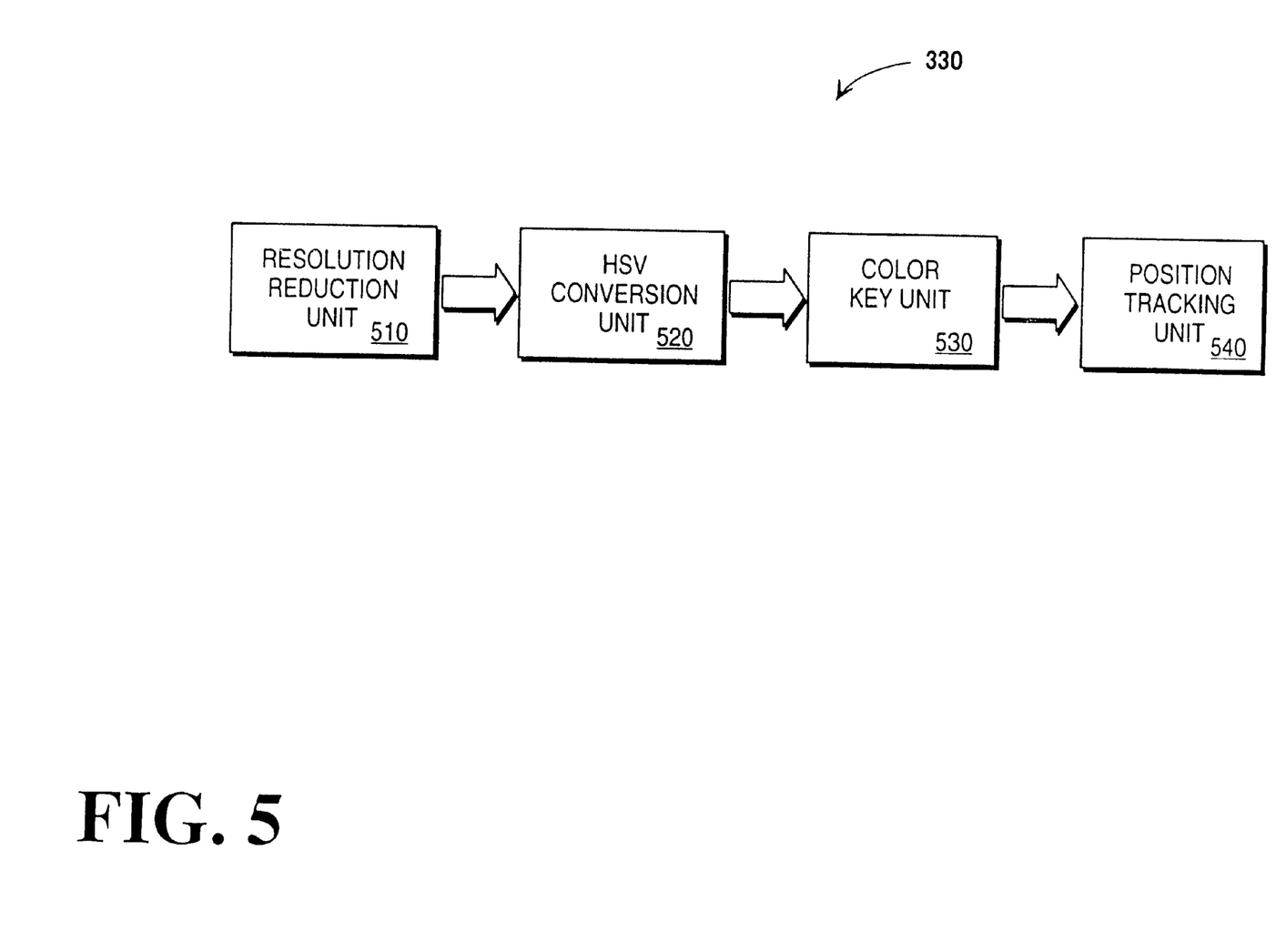
FIG. 5 is a block diagram of a pointer position detector according to an embodiment of the present invention.

FIG. 5 is a block diagram of a pointer position detector 330 according to an embodiment of the present invention. The pointer position detector 330 includes a resolution reduction unit 510. The resolution reduction unit 510 operates similarly to the resolution reduction adjustment unit 410 (shown in FIG. 4). The resolution reduction unit 510 receives frames of data from the camera interface 310 (shown in FIG. 3). The resolution reduction unit 510 reduces the resolution of the frames of data. The resolution reduction unit 510 may reduce the resolution of the frames of data by sub-sampling, aliasing, filtering, or other technique. Reducing the resolution of the frames of data condenses the data and allows it to be processed by the pointer position detector 330 at a faster rate.

A hue saturation value (HSV) conversion unit 520 is coupled to the resolution reduction unit 510. The HSV conversion unit 520 receives the frames of data from the resolution reduction unit 510 and converts the frames of data from a RGB color mapping scheme to a HSV color mapping scheme. The HSV color mapping scheme defines images with color and brightness components. Converting the frames of data to an HSV color mapping scheme allows the pointer position detector 330 to ignore the brightness component in the frame of data and process color components in the frames of data more effectively.

A color key unit 530 is coupled to the HSV conversion unit 520. The color key unit 530 receives the frames of data from the HSV conversion unit 530 and identifies the pixels in the frame of data of a specific color. The color key unit 530 may be preprogrammed to identify a specific color of a pointing mechanism so that it may identify an image of the pointing mechanism in a frame of data.

A position tracking unit 540 is coupled to the color key unit 530. The position tracking unit 540 receives the identity of the pixels that have the color of the pointing mechanism from the color key unit 530. The position tracking unit 540 finds the center of the largest group of pixels having the color of the pointing mechanism and defines that location as the position of the pointing mechanism.

It should be appreciated that the pointer position detector 330 may be implemented without the resolution reduction unit 510 and the HSV conversion unit 520. The resolution reduction unit 510, the HSV conversion unit 520, the color key unit 530, and the position tracking unit 540 may be implemented by any known circuitry or technique. In an embodiment of the present invention where the pointer position detector 330 is implemented in hardware, the resolution reduction unit 510, the HSV conversion unit 520, the color key unit 530, and the position tracking unit 540 all reside on a same silicon substrate.

Figure 6:
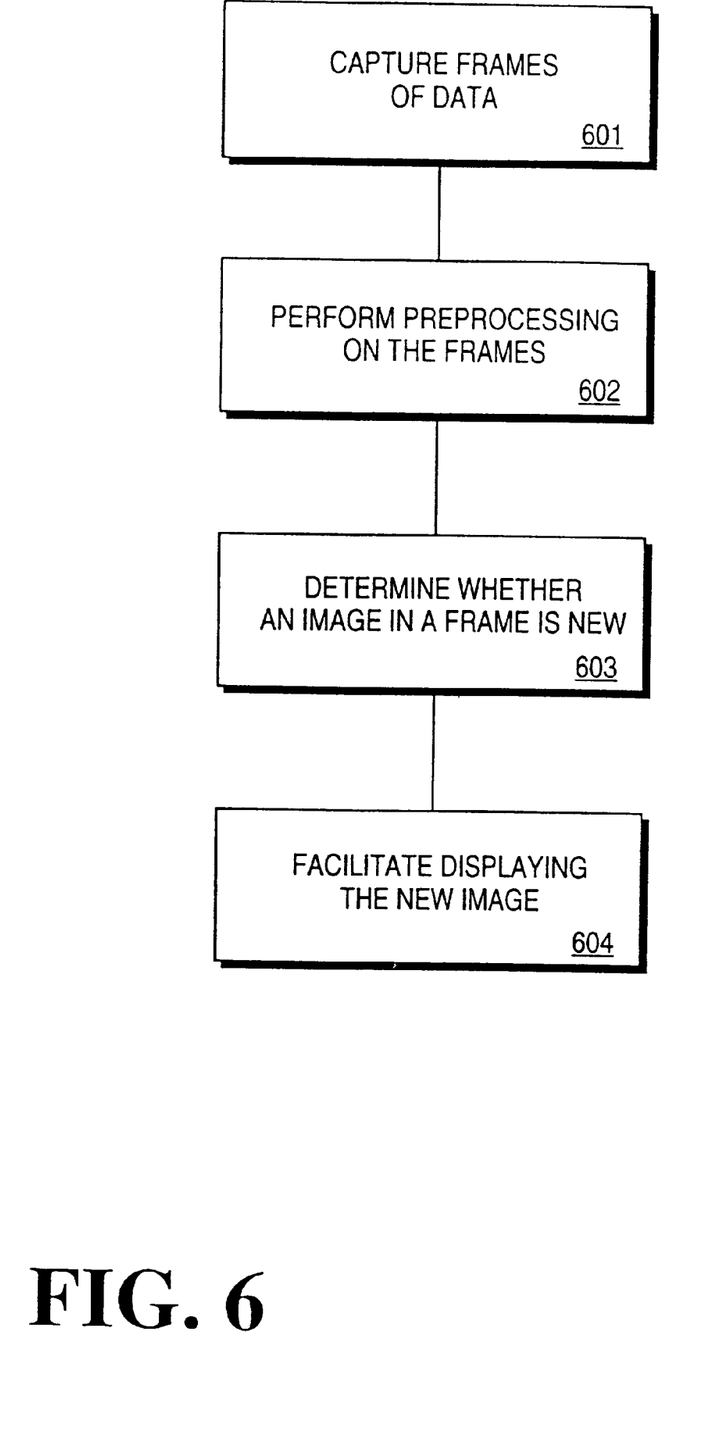
FIG. 6 is a flow chart illustrating a method for managing data according to a first embodiment of the present invention.

FIG. 6 is a flow chart illustrating a method for managing frames of data according to an embodiment of the present invention. At step 601, frames of data are captured from an image at a location. The image may include an image of a foil and a pointer mechanism. According to an embodiment of the present invention, a frame rate in which the frames of data are captured from the location may be specified to reduce processor speed constraints.

At step 602, preprocessing is performed on the frames of data. According to an embodiment of the present invention, proprocessing may include the steps of reducing resolution of the frames of data, converting the frames of data from color to monochrome format, and performing edge enhancement on the frames of data.

At step 603, it is determined whether the image in a frame of data is a new image. According to an embodiment of the present invention, determining whether an image is a new image is achieved by comparing a frame of data captured at a time t with a frame of data captured at time t−1 to determine if the image from the location is moving. Next, n sequential frames that contain no motion are counted after the time t. The last frame of the n sequential frames is compared with a frame of data previously displayed to determine whether the last frame of the n sequential frames corresponds to the new image.

At step 604, the frame of data is facilitated for display if the image is a new image. According to an embodiment of the present invention, facilitating the display of the image is achieved by transmitting a location of where the frame of data is stored to a remote computer system, or transmitting the frame of data to a remote computer system.

Figure 7:
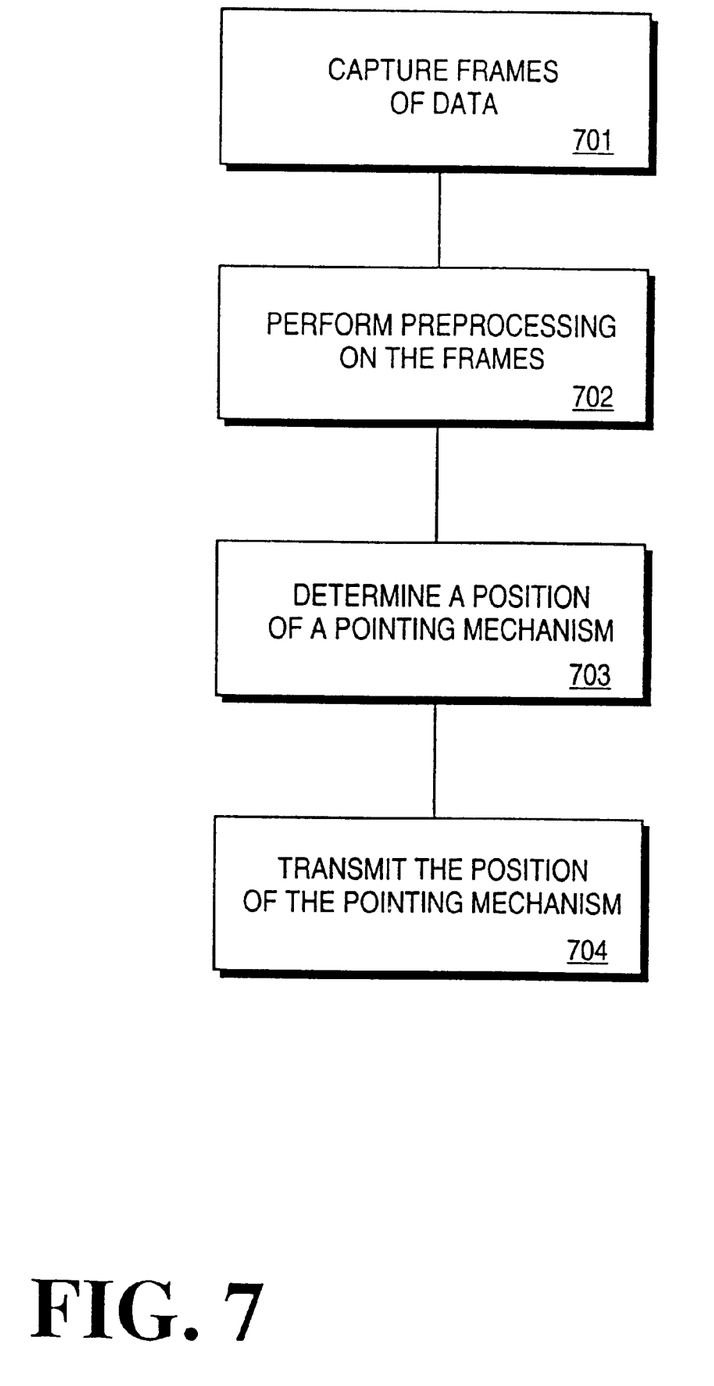
FIG. 7 is a flow chart illustrating a method for managing frames of data according to a second embodiment of the present invention.

FIG. 7 is a flow chart illustrating a method for managing frames of data according to a second embodiment of the present invention. At step 701, frames of data are captured from an image at a location. The image may include an image of a foil and a pointer mechanism. According to an embodiment of the present invention, a frame rate in which the frames of data are captured from the location may be specified to reduce processor speed constraints.

At step 702, preprocessing is performed on the frames of data. According to an embodiment of the present invention, preprocessing may include the steps of reducing resolution of the frames of data, and converting the frames of data from an RGB color mapping scheme to an HSV color mapping scheme.

At step 703, a position of a pointer mechanism is found in the frames of data. According to an embodiment of the present invention finding a position of the pointer mechanism is achieved by applying a color key to the frames of data to identify pixels of a same color as the pointer mechanism, and defining a center of a group of the identified pixels as the position of the pointer mechanism.

At step 704, the position of the pointer mechanism is transmitted to a remote computer system.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are to be regarded in an illustrative rather than a restrictive sense.

What is claimed is:

1. A method comprising:
   capturing a frame of data from an image received at a video device at a time t;
   comparing the frame of data captured at time t with a frame of data captured at time t−1 to determine if the image is moving;
   counting n sequential frames that contain no motion after the time t;
   comparing a last frame of the n sequential frames with a frame of data previously displayed as a new image to determine whether the last frame of the n sequential frames corresponds to a new image; and
   facilitating display of the frame of data if the image is the new image.

2. The method of claim 1, wherein facilitating display of the frame of data comprises transmitting a location of where the frame of data is stored to a remote computer system.

3. The method of claim 1, wherein facilitating display of the frame of data comprises transmitting the frame of data to a remote computer system.

4. The method of claim 1, further comprising:
   reducing resolution of the frame of data;
   converting the frame of data from color to monochrome format; and
   performing edge enhancement on the frame of data.

5. The method of claim 1, further comprising:
   determining a position of a pointer mechanism in the image; and
   transmitting the position of the pointer mechanism to a remote computer system.

6. The method of claim 5, wherein determining the position of the pointer mechanism in the image comprises:
   applying a color key on the frame of data; and finding a center of an object matched with the color key.

7. The method of claim 6, further comprising the step of:

reducing resolution of the frame of data; and converting the frame of data to a hue saturation value (HSV) format.

8. A method comprising:

capturing a frame of data from an image received at a video device at a time t;

comparing the frame of data captured at time t with a frame of data captured at time t−1 to determine if the image is moving;

counting n sequential frames that contain no motion after the time t;

comparing a last frame of the n sequential frames with a frame of data previously displayed as a new image to determine whether the last frame of the n sequential frames corresponds to a new image;

determining a location of a pointer mechanism in the image; and transmitting the location of the pointer mechanism to a remote computer system.

9. The method of claim 8, wherein determining the position of the pointer mechanism comprises:

applying a color key on the frame of data; and finding a center of an object matched with the color key.

10. The method of claim 9, further comprising:

reducing resolution of the frame of data; and converting the frame of data to a hue saturation value (HSV) format.

11. The method of claim 8, further comprising displaying the frame of data if the image is the new image.

12. A computer-readable medium having a sequence of instructions stored thereon, the sequences of instructions, when executed by a processor, causes the processor to perform:

capturing a frame of data from an image received at a video device at a time t;

comparing the frame of data captured at time t with a frame of data captured at time t−1 to determine if the image is moving;

counting n sequential frames that contain no motion after the time t; and comparing a last frame of the n sequential frames with a frame of data previously displayed as a new image to determine whether the last frame of the n sequential frames corresponds to a new image; and displaying the frame of data if the image is the new image.

13. The computer-readable medium of claim 12, further comprising instructions, the instructions when executed by the processor, causes the processor to perform:

determining a position of a pointer mechanism in the image; and transmitting the position of the pointer mechanism to a remote computer system.

14. A computer-readable medium having a sequence of instructions stored thereon, the sequence of instructions, when executed by a processor, causes the processor to perform:

capturing a frame of data from an image received at a video device;

comparing the frame of data captured at time t with a frame of data captured at time t−1 to determine if the image is moving;

counting n sequential frames that contain no motion after the time t; and comparing a last frame of the n sequential frames with a frame of data previously displayed as a new image to determine whether the last frame of the n sequential frames corresponds to a new image;

determining a location of a pointer mechanism in the image; and transmitting the location of the pointer mechanism to a remote computer system.

15. The computer-readable medium of claim 14, wherein determining the position of the pointer mechanism comprises:

applying a color key on the frame of data; and finding a center of an object matched with the color key.

16. The computer-readable medium of claim 14, further comprising instructions, the instructions when executed by the processor, causes the processor to perform displaying the frame of data if the image is the new image.

17. A digital opaque projector, comprising: an image change detector that includes;

a frame comparator that compares a frame of data captured from an image at a time t with a frame of data captured at a time t−1 to determine if the image is moving; and a foil comparator, coupled to the frame comparator, that counts n sequential frames that contain no motion after the time t and compares a last frame of the n sequential frames with a frame of data previously displayed as a new image to determine whether the last frame of the n sequential frames corresponds to a new image;

a pointer position detector that determines a position of a pointer mechanism in the frame of data; and a distributive program interface, coupled to the image change detector and pointer position detector, that facilitates the displaying of the new image and the position of the pointer mechanism at a remote location.

18. The digital opaque projector of claim 17, wherein the pointer position detector comprises:

a color key unit that identifies pixels in the frame of data of a specific color; and a position tracking unit, coupled to the color key unit, that identifies a position of a center of the pixels in the frame of data of the specific color.

* * * * *